Aug. 3, 1954
H. O. DEAN
2,685,145
SECTIONAL FISH LURE
Filed July 24, 1952
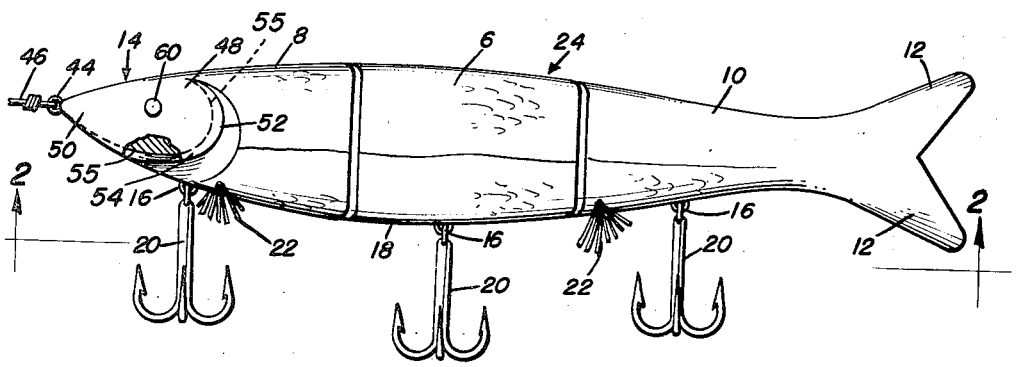
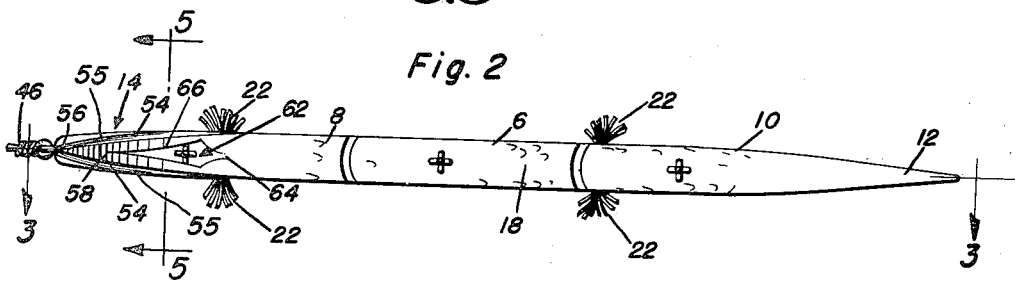
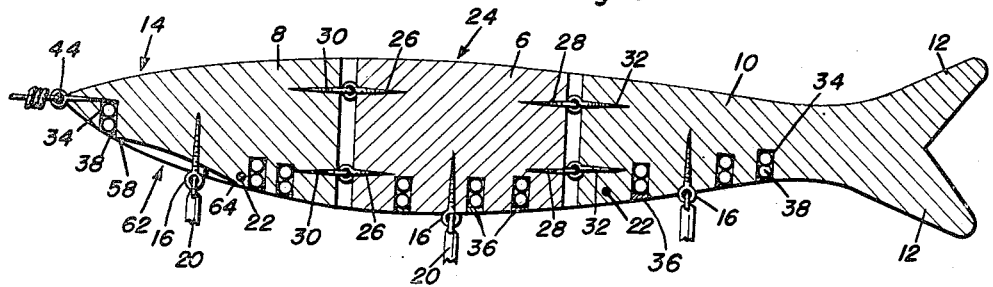
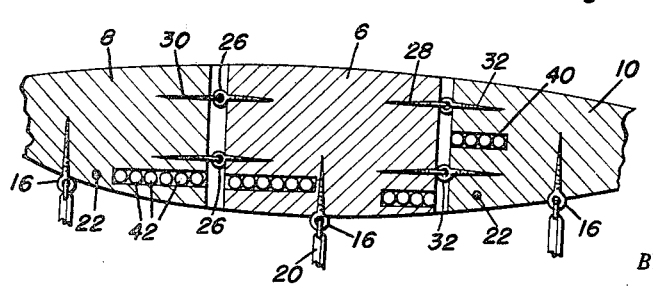
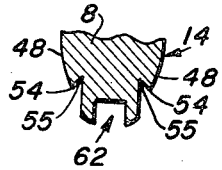
Howard O. Dean
INVENTOR.
BY *Clarence A. O'Brien*
*and Harvey B. Jackson*
Attorneys Patented Aug. 3, 1954

2,685,145

UNITED STATES PATENT OFFICE 2,685,145

SECTIONAL FISH LURE

Howard O. Dean, Sayner, Wis.

Application July 24, 1952, Serial No. 300,706

3 Claims. (Cl. 43—42.15)

The present invention relates, generally speaking, to certain new and useful improvements in what is believed to be an efficacious fishing lure in that the latter is in such near resemblance in appearance and construction to a given kind of a fish that it acts and looks like the fish imitated.

In carrying out the principles of the invention, a lure is provided which may be classed as a surface bait but lends itself to submersion in the water when variously sized sinkers are attached to the fishing line leader.

Another aspect of the invention has to do with baits which satisfactorily lend themselves to productive manufacture in several sizes, the largest of which is approximately 10 inches long and is consequently highly satisfactory when fishing for muskellunge.

In order to provide satisfactorily performing lures in this large size category it is the practice where other baits are concerned to utilize spoons, scoops and similar projecting baffles and baits so made can be used only as underwater bait unless they are retrieved extremely slowly. The instant bait has to do with one which will stay on the surface regardless of the speed of retrieving, unless sinkers are attached to the leader, which other baits cannot ordinarily do, and this result is capable of accomplishment due to the fact that a unique head construction is employed which latter is characterized by a novel throat and imitation gill arrangement.

Instead of using an inserted or similarly attached tail the instant lure relies upon a tail construction which is an integral part of the trailing end of the structure and this is either carved or molded so that it is a striking resemblance of a natural fish tail.

Experience has shown that the use of springs and similar mechanical expedients which are visibly positioned on an artificial bait detract from the desired life-like appearance and it is therefore an object of the invention to structurally, functionally and otherwise improve upon similarly performing lures by eliminating entirely such extra mechanical contrivances and to rely upon either carved or molded head and tail imitations which greatly enhance the over-all realistic properties and effects of the imitated fish, for example, natural perch, walleye pike, cisco, brook trout, and various minnows such as shiner, dace and sucker.

Briefly stated, the preferred embodiment of the invention takes the form of a replica of a given variety of a live fish and which not only looks like but acts like the variety which is represented, comprising a body section and head and tail sections fashioned to imitate a substantially flat-sided natural fish, the tail on the tail section being rigid and carved to simulate a genuine tail, and the head on the head section being likewise rigid and carved and delineated to simulate not only the head proper but the usual gills and intervening throat as well, wherein said gills are generally teardrop-shaped in marginal configuration, said gills being marginally carved in relief, whereby they project and stand out as prominent life-like gill covers in striking contrast with the adjacent rearwardly disposed surfaces of said sections.

Construed somewhat more specifically than above recited the instant invention appertains to an artificial lure imitative of a natural fish comprising a sectional body, there being a head section of one-piece form whose leading end is fashioned to represent a head, the latter having imitation gills with rounded trailing end portions and also with lower edge portions gradually merging with said rounded edges, said lower edge portions being substantially flush with the ventral surface and converging at their leading ends and defining a V-shaped crotch and an intervening throat, and shallow flow interrupting recess means incorporated in said throat and confined to a location midway between said depending edge portions and cooperating with the latter in causing a slight agitation or whirlpool effect and imparting life-like mannerisms to the over-all lure.

Then too, novelty is predicated on the aforementioned selection and cooperation of structural features wherein the means mentioned is in the form of a recess which is of a marginal outline resembling what may be defined as substantially diamond shaped, a configuration which is characterized by small and large opposing angles or triangular half portions base-to-base with their vertices lined up with each other and also lined up with the crotch which is provided at the forward converging ends of the marginal edge portions of said gills.

Objects more limited in character will be set forth as the following description becomes more complete.

In the drawings:

Figure 1 is a side elevational view of an artificial bait or fishing lure, with portions broken away, constructed in accordance with the principles of the present invention;

Figure 2 is a bottom view which may be said to be taken approximately on the plane of the line 2—2 of Figure 1 looking in the direction of the arrows;

Figure 3 is a central longitudinal sectional view on the line 3—3 of Figure 2 looking in the direction of the arrows;

Figure 4 is a fragmentary sectional view similar to Figure 3 but showing a slight modification in construction.

Figure 5 is a greatly enlarged fragmentary cross section taken on the plane of the line 5—5 of Figure 2 looking in the direction of the arrows.

Referring now to the drawings the central body section, of wood, commercial plastics, or the like, is denoted by the numeral 6, whereas the head section is denoted at 8 and the tail section at 10. It will be noted that the tail fins 12 are rigid and integral with the tail section and in practice these are either molded or carved so that they are almost exact representations of the tail of the fish which is imitated here. The head section is characterized by a unique head 14 to be hereinafter specifically described. Screw-eyes 16 are attached to the ventral portion 18 of the respective sections to accommodate conventional fish hooks 20. The numerals 22—22 designate suitable side fins. The dorsal portion of the overall sectional body is denoted by the numeral 24.

As best seen in Figure 3, the forward and rearward vertical edge portions of the body section 6 are provided with upper and lower pairs of screw-eyes 26—26 and 28—28. The screw-eyes 26—26 are hingedly connected with horizontal upper and lower screw-eyes 30—30 on the rear or trailing end of the head section 8 providing the desired hinge action between sections 6 and 8. Similar screw-eyes 32—32 are provided in the forward edge of the tail section 10 and these are connected with the screw-eyes 28—28 and provide the desired hinge connection between the tail and body sections. To obtain the desired ballast and balancing effect the ventral portions of the respective sections are provided with pockets. Each pocket is in the form of a vertical bore 34 having a closing plug 36 (see Fig. 3 at center thereof) which retains ball or equivalent weights 38 in the pockets. The weights are used to maintain balance and to keep the lure in an upright position.

If instead of using vertical bores or pockets the balancing result is desired otherwise, it is within the purview of the invention to provide the sections with horizontal bores 40 in which horizontal rows of ball weights 42 are arranged in the manner shown in the modification shown in Figure 4.

An incidental aspect of the invention has to do with a line eye 44 which is attached to the nose of the head and which serves to accommodate the fishing line 46.

The carved or molded head means 14 is the most significant aspect of the instant presentation. In respect to this it is to be observed that the cross-sectional dimension of the leading end of the head section is increased so as to provide a pair of opposed imitation gills 48—48. Each gill is approximately teardrop-shaped in marginal outline and the smaller leading end portions provide the desired nose 50 while the trailing end portions are curved or rounded to provide arcuate edge formations 52—52. The lower portions of these edges 54—54 are channeled, as at 55, and said channels converge toward the nose and form a crotch, as at 56. Thus, by channeling the gills, the intervening throat 58 becomes approximately V-shaped in bottom plan. The crotch 56 slants forwardly and upwardly where its vertex is in approximate axial alignment with the lengthwise axis of the over-all body structure. This construction feeds or channels the water downwardly and beneath the throat and then upwardly around and behind the protruding or overhanging edge portions 52—52 of the gills. The head is provided with eyes 60 for further realistic effect.

I depend not only on the V-shaped water channeling throat but, in addition, on the recess 62 seen in Figure 2 and which interrupts the flow of water and causes a slight agitation or whirlpool effect. The recess is located in the V-shaped surface referred to as the throat. This recess is substantially diamond-shaped in outline, is shallow and the smaller rearward triangular portion thereof is denoted at 64 and a larger triangular portion is denoted at 66. The apices of these triangular portions or opposing angles align with each other and also with the heel-like ventral portion 18 and in addition with the crotch 56. The apex of the portion 66 is spaced rearwardly from the crotch, so that there is a slight smooth throat surface between the crotch and recess 62.

Great emphasis is placed on the true life-like representation or carving of the gill and throat construction and the special components thereof which not only do away with metal scoops and the like but which provide an adaptation which imparts the desired life-like effects insofar as the over-all sectional body with rigid tail is concerned.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having thus described the invention, what is claimed as new is:

1. An artificial lure imitative of a natural live fish comprising a sectional body, there being a head section of one-piece form whose leading end is fashioned to represent a head, the latter having imitation gills formed in prominent relief and having rounded trailing end edge portions and also having the lower edge portions gradually merging with said rounded edges, said lower edge portions being substantially flush with the ventral surface and converging at their leading ends and defining a V-shaped crotch and an intervening throat, and said throat having a recess in the bottom thereof and confined to a location midway between the marginal edge portions of the throat and cooperating with the latter in imparting life-like mannerisms to the over-all lure.

2. The structure defined in claim 1, wherein said recess is characterised as being shallow and acting to interrupt the flow of water, causing a slight agitation or whirlpool effect.

3. The structure defined in claim 2, wherein said recess is substantially diamond shaped in marginal outline with the vertices of opposing angles axially aligned with each other and also with said crotch.

References Cited in the file of this patent

UNITED STATES PATENTS

| Number | Name | Date |
| --- | --- | --- |
| 857,883 | Kreisser | June 25, 1907 |
| 1,698,735 | Roberts | Jan. 15, 1929 |
| 1,813,843 | Flood | July 7, 1931 |
| 2,478,801 | Yungel | Aug. 9, 1949 |
| 2,483,245 | Steinhart | Sept. 27, 1949 |